United States Patent [19]

Perrone

[11] 4,045,340

[45] Aug. 30, 1977

[54] METHOD FOR RECOVERING AND EXPLOITING WASTE OF THE CHROMIC ANHYDRIDE PRODUCTION

[75] Inventor: Diego Perrone, Cogoleto, Italy

[73] Assignee: Luigi Stoppani di P Stoppani & C., Milan, Italy

[21] Appl. No.: 704,954

[22] Filed: July 13, 1976

[30] Foreign Application Priority Data

Aug. 28, 1975 Italy .................................. 26686/75

[51] Int. Cl.² .............................................. C02B 1/20
[52] U.S. Cl. ...................................... 210/45; 210/56; 210/71; 210/73 R; 423/55; 423/595; 423/607
[58] Field of Search ................... 210/42 R, 45, 49, 56, 210/70, 60, 57, 65, 67, 66, 73 R, 47, 71; 423/607, 595, 55, 58

[56] References Cited

U.S. PATENT DOCUMENTS

| 3,002,815 | 10/1961 | Heinze | 423/607 |
|---|---|---|---|
| 3,592,609 | 7/1971 | Honbo | 423/607 |
| 3,929,978 | 12/1975 | Morero et al. | 423/607 |

*Primary Examiner*—Thomas G. Wyse
*Assistant Examiner*—Benoit Castel
*Attorney, Agent, or Firm*—Fleit & Jacobson

[57] ABSTRACT

A process of recovering and exploiting wastes from chromic anhydride production, wherein the slurry comprising a water suspension of solid waste residue from chromic anhydride processing is subjected to a first reaction stage with sodium chromate solution at a constant flow rate and such a density as to avoid precipitation of sodium sulfate, setting pH to 2-8 by adjusting the slurry flow rate, and finally separating by filtering insoluble chromium chromate formed from the sodium bichromate and sodium sulfate solution.

9 Claims, No Drawings

METHOD FOR RECOVERING AND EXPLOITING WASTE OF THE CHROMIC ANHYDRIDE PRODUCTION

This invention relates to a process of recovering and exploiting values contained within the waste of the chromic anhydride production.

Particularly, the invention provides full recovery of trivalent and hexavalent chromium values and exploitation thereof as valuable derivatives of chromium, and also provides the recovery of sodium bisulfate for recycling to processing of sodium bichromate.

As well known, in the method of producing ($CrO_3$) chromic anhydride from sodium bichromate and sulfuric acid, a waste residue is obtained which is highly pollutant and can be hardly disposed of, essentially comprising sodium bisulfate, sulfuric acid and more or less significant values of trivalent and hexavalent chromium compounds.

When treated with water, this waste mass will form a slurry comprising a solution of sodium bisulfate, sulfuric acid, chromic acid and chromium bisulf-ate, and a substantially insoluble compound of trivalent chromium of a varying composition, which in the following will be referred to as "chromium bisulfate".

Because of its high degree of acidity, due to the presence of sulfuric acid and sodium acid sulfate (or bisulfate), the slurry thus obtained could be used, through recycling to the processing of sodium bichromate, as acidificant in conversion of sodium chromate from standard chromite processing, into sodium bichromate.

However, this could not hitherto be carried out due to the presence of water soluble trivalent chromium. Thus, even assuming a possible economical separation by filtration of the insoluble fraction (chromium bisulfate), the remaining solution containing soluble trivalent chromium would anyhow contaminate the sodium bichromate line of production, giving rise to serious disadvantages, such as alterations in the usual characteristics of the final product, and difficulties in filtration.

The process according to the present invention avoids the above mentioned disadvantages, by providing complete separation of trivalent chromium in the waste, through precipitation in the form of a compound having the formula

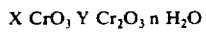

which in the course of the present specification and claims will be referred to as "chromium chromate", which compound can be readily and completely filtered and washed with water and which is also soluble, particularly in acids.

Then, when taking into account that this compound consists only of chromium and oxygen, it will be appreciated that the compound is a useful raw material in preparing valuable and particularly pure chromium compounds in a simple and ready way. Those skilled in the art will recognize the wide possibilities provided by such a realization.

By completely precipitating trivalent chromium the advantage is also provided of recovering pure sodium sulfate, free of trivalent chromium, so that separation by centrifugation of this product can also be obtained.

Finally, the process according to the present invention provides the substantial advantage of solving the ecological problem of the disposal of materials otherwise dangerously polluting the environment, and this without the use of expensive processes.

The process according to the present invention essentially consists of solubilizing and completely removing soluble and insoluble trivalent chromium in the waste slurry, by means of a reaction taking advantage of acidity of wastes (sulfuric acid and sodium bisulfate) for the conversion of sodium chromate into sodium bichromate according to the conventional scheme:

Either a batch or a continuous operation can be used, although the second system is preferable and, therefore, the second system will be hereinafter described in further detail.

The process according to the present invention is carried out in two stages, of which the first stage is accomplished within a reactor, on one hand introducing thereinto the slurry, as provided by previous dispersion of processing waste in water, and in a particular ratio as better defined in the following, and on the other hand a solution of sodium chromate at a concentration exactly adjusted in accordance with the slurry dilution, so as to initially avoid precipitation of sodium sulfate, that is under unsaturated conditions of this salt. Therefore, it is necessary to establish in the medium such acidity and concentration conditions of all of the salts as to provide a chromium chromate exhibiting a particular crystalline structure, readily filtrable and separable from the other salts, and at the same time such that the precipitation of any other salt is prevented. It should be noted that chromium chromate is generally considered as a salt of difficult economical filtration.

Such a regulation of environment conditions is provided by adjusting the specific gravity of sodium chromate solution and slurry, respectively, so as to obtain in the reactant within the reactor a specific gravity in the range of 1.2-1.4, thus preventing the precipitation of all of the salts except chromium chromate, as above stated (that is, adjusting the amount of water introduced either with the slurry or with the chromate solution, and in case with direct addition of water).

From the foregoing, it will be appreciated that the specific gravity of sodium chromate can be varied, maintaining a constant specific gravity for the slurry, or conversely varying the latter maintaining a constant specific gravity for the chromate.

In the strict sense, operation the could also be carried out by introducing into the reactor the solid waste as it comes out of the main plant or system. In practice, it was found convenient to operate with a slurry diluted to about 1:1, that is having a specific gravity of about 1.4 (to contain the volume, also taking into accounts its characteristics of chemical aggressiveness), and accordingly with a sodium chromate solution having a specific gravity of about 1.25, as under these conditions the assurance was observed of solubility of all the salts, except "chromium chromate", if pH of the medium is set in the range of 2-8, preferably about 4-6. The other conditions to be met in the first reactor are a temperature between 70° and 250° C, preferably between 90° and 130° C, and an average stay time of the reactant mass within the reactor between 10 and 600 minutes, preferably between 10 and 60 minutes.

Firstly, in the reactor, the conversion takes place of water soluble chromium bisulfate into insoluble chromium chromate (that is, soluble trivalent chromium, contained in the waste as chromium bisulfate is converted into water insoluble chromium chromate). On the other hand, insoluble chromium bisulfate, also containing Cr$^{III}$, is only partially converted, therefore requiring a further treatment.

This is accomplished in the second stage with the passage of the slurry outflowing from the reactor and comprising Na$_2$Cr$_2$O$_7$, Na$_2$SO$_4$, chromium bisulfate and insoluble chromium chromate. Here, conversion of insoluble chromium bisulfate into acid soluble chromium chromate is completed. This transfer of the reacting mass to the curing vessel of the second stage enables the continuous processing of the waste, without unduly increasing the reactor overall size. In practice, the stay time in the curing vessel will depend on the concentration of insoluble chromium bisulfate. The curing conditions of the second stage are the same as those of the first stage, i.e., a pH of about from 2 to 8, a temperature of about from 70° to 250° C, and a time period of about from 10 to 600 minutes.

On curing completion, the curing vessel contents, comprising an aqueous solution of sodium sulfate, sodium bichromate, residual sodium chromate and solid chromium chromate is supplied to filtering, which can be carried out by conventional means.

To this end, can be made of filtering apparatus operating under moderate pressure, or centrifugals with non-surforated baskets. However, although providing good results in separating solids from liquid, the latter system would inhibit complete removal of mother liquids from chromium chromate, whereby purity is limited. Conversely, with filtering methods, such as the first mentioned method, including a washing operation, "chromium chromate" is provided of the formula X CrO$_3$ Y Cr$_2$O$_3$ n H$_2$O, having a titer of about 99.9%, as determined from the atomic absorption analysis.

As previously mentioned, this high degree of purity allows the use of chromium chromate as a raw material for producing valuable chromium salts (neutral sulfate, basic sulfate, oxalate, chloride, etc.) due to high solubility in acids. As it will be seen in the following examples, to provide said salts, the acidic solutions of chromium chromate are treated with "clean" reducing agents, that is, these that will not give rise to such by-products as will contaminate the salts to be obtained, as desired. For example, for the production of chromium acetate, formaldehyde can be used and in preparing chromium sulfate SO$_2$ can be used. By this operation, hexavalent chromium is reduced to trivalent chromium. The solution thus obtained contains only trivalent chromium ions (Cr$^{+3}$) and anions of the selected acid in stoichiometric ratio.

The chemical reactions involved in the process of using the waste of processing of chromic anhydride above described are:

2Na$_2$CrO$_4$ + 2NaHSO$_4$ → Na$_2$Cr$_2$O$_7$ + 2Na$_2$SO$_4$ + H$_2$O   (1)

2Na$_2$CrO$_4$ + H$_2$SO$_4$ → Na$_2$Cr$_2$O$_7$ + Na$_2$SO$_4$ + H$_2$O   (2)

X Cr(HSO$_4$)$_3$ + Y Na$_2$Cr$_2$O$_7$ → XCr$_2$O$_3$ · YCrO$_3$ nH$_2$O + ZNa$_2$SO$_4$   (3)

(soluble and insoluble)

Hereinafter some examples are given for treating wastes in processing chromic anhydride by the process according to the present invention, the examples aiming to provide an even clearer explanation to the foregoing description and which are not to be intended as a limitation thereto.

EXAMPLE 1

Batch Process for Recovering Sodium Bisulfate and Chromium Values from Wastes in Chromic Acid Processing In a 2000 ml flask, provided with reflux cooler, 202 g solid waste from chromic anhydride processing, 290 g sodium chromate, and 990 g water were introduced. The slurry thus obtained was brought to ebullition and maintained for 30 minutes. After filtering, 148 g residue as "unwashed wet cake" and 1334 g clear solution free of trivalent chromium were obtained.

Hereinbelow the analysis data are given for the "unwashed wet cake" and clear solution.

| "unwashed wet cake" | |
|---|---|
| Humidity | 64% |
| Cr$^{VI}$ (as CrO$_3$) | 10.03% |
| Cr$^{III}$ (as Cr$_2$O$_3$) | 4.7% |
| Clear solution | |
| Density (Bé at 15° C) | 35.0 |
| Total Cr, as CrO$_3$ per 100 g solution | 12.81 |
| Na$_2$SO$_4$, as Na$_2$SO$_4$, per 100 g solution | 15.57 |

EXAMPLE 2

Continuous Process for Recovering Sodium Bisulfate and Chromium Values from Wastes in Chromic Anhydride Processing To a 4000 ml reflux reactor, heated at 103° C, a sodium chromate solution (density 1.28) at a flow rate of 3000 ml/hour and a slurry containing sodium bisulfate (1:1 diluted in water) at a flow rate of 1000 ml/hour were supplied.

The reactor, provided with a stirrer, was maintained at a constant temperature of 103° C by a heating skirt.

Under such operative conditions, pH of the mixture was maintained at a constant 5.6.

The reaction product was then supplied to the curing apparatus, remaining therein for about 60 minutes at ebullition temperature to provide for curing, then supplied to filtering.

After filtering through a Buchner funnel, for 1 kg reaction product the yield was:

20 g unwashed wet cake 980 g clear solution free of trivalent chromium, respectively having the following composition:

| Clear solution, free of trivalent chromium: | | |
|---|---|---|
| Density | Bé 15°C | 35.0 |
| pH | 25°C | 5.5 |
| Chromium | CrO$_3$/100 g solution | 12.14 |
| Sodium sulfate | Na$_2$SO$_4$/100 g solution | 16.49 |
| "unwashed wet cake" | | |
| Humidity | g H$_2$O | 46.0% |
| Sodium sulfate | g Na$_2$SO$_4$ | 11.5% |
| Hexavalent chromium | g chromium as CrO$_3$ | 16.1% |
| Trivalent chromium | g chromium as Cr$_2$O$_3$ | 23.2% |

After washing with distilled water, the wet cake provided as above described gave the following values:

| Humidity | H₂O | 53.2% wt. |
|---|---|---|
| Sodium | Na | 0.03% |
| Hexavalent chromium | CrO₃ | 8.92% |
| Trivalent chromium | Cr₂O₃ | 33.38% |

From the above analysis it will be seen that the "unwashed wet cake" essentially contains water and trivalent and hexavalent chromium compounds, thereby forming an optimum raw material for obtaining chromium salts of difficult preparation in a high degree of purity.

In both of the above examples, for 100 g reacted solid waste residue, 5.15 g washed and dried chromium chromate were obtained, the remaining comprising the solution containing sodium sulfate and sodium bisulf-ate, suitable to be supplied to the hexavalent chromium line.

EXAMPLE 3

Process for Preparing High Titer Chromium Sulfate from Chromium Chromate as Obtained from Waste Residues in Chromic Anhydride Processing 58.5 g washed wat cake, as provided in Example 2, were introduced into a flask with 24.0 g 98% $H_2SO_4$ and 17.5 g distilled water. The solution was brought to ebullition and maintained for about 60 minutes at 100° C. Then, hexavalent chromium was completely reduced. At analysis, the product brought to dryness gave the following values:

| $H_2O$ insoluble residue at ebullition | 0.01% |
|---|---|
| Cold $H_2O$ insoluble residue | 0.01% |
| Chromium as $Cr_2O_3$ | 34.03% |
| Chemical basicity as $SO_3 / Cr_2O_3$ | 100.42 | from which it will be seen that chromium sulfate obtained has a very high titer in $Cr_2O_3$ (34.03%).

EXAMPLE 4

Process for Producing $CrCl_3 \cdot 6H_2O$ Free of Impurities from Washed Wet Chromium Chromate Cake In a 1000 ml vessel, 100 g chromium chromate, as obtained from the washed wet cake of Example 2, were treated with 125 g 37% HCl by weight at ebullition temperature and under stirring. Hexavalent Cr was then reduced with formaldehyde. Ebullition was continued to reach the concentration conditions for the precipitation of crystals of chromium chloride $CrCl_3 \cdot 6H_2O$. Then, the crystalline chromium chloride thus obtained was isolated by centrifugation. The product has a degree of purity of 99.92%, is readily soluble in hot and cold water and methanol, without leaving any trace of residue.

The above described examples can be perfectly reproduced on an industrial scale.

What is claimed is:

1. A process for treating the waste residue, resulting from the reaction of sodium bichromate and sulfuric acid in the production of chromic anhydride, to recover chromium values and other products therefrom, such waste residue consisting essentially of sodium bisulfate, sulfuric acid, and a hexavalent chromium compound consisting essentially of chromium trioxide, all of which are water-soluble, and a trivalent chromium compound consisting essentially of chromium bisulfate which is water-insoluble, said process comprising:

a. mixing said waste residue with water to form a first aqueous slurry comprising a solution containing sodium bisulfate, sulfuric acid, and chromic acid with the water-insoluble chromium bisulfate suspended therein;

b. forming a reaction mixture of the first aqueous slurry obtained in step (a) with an aqueous solution of sodium chromate, said reaction mixture having a specific gravity of about from 1.2 to 1.4 and a pH of about from 2 to 8, and heating said reaction mixture at a temperature of about from 70° to 250° C for about from 10 to 600 minutes, whereby part of the water-insoluble chromium bisulfate is converted into water-insoluble chromium chromate which precipitates out, thereby to obtain a second aqueous slurry comprising a solution containing sodium sulphate and sodium bichromate with the precipitated water-insoluble chromium chromate and the remainder of the unconverted, water-insoluble chromium bisulfate suspended therein;

c. curing the second aqueous slurry obtained from step (b), having a pH of about from 2 to 8, at a temperature of about from 70° to 250° C for about from 10 to 600 minutes to convert the remainder of the water-insoluble chromium bisulfate into water-insoluble chromium chromate thereby to obtain a third aqueous slurry comprising a solution containing sodium sulfate and sodium bichromate with the water-insoluble chromium chromate suspended therein; and d. subjecting the third aqueous slurry obtained from step (c) to solid-liquid separation to recover a solid consisting essentially of chromium chromate and an aqueous solution containing sodium sulfate and sodium bichromate.

2. The process of claim 1 wherein the specific gravity of the reaction mixture is attained by mixing the first aqueous slurry having a specific gravity of about 1.4 with sodium chromate solution having a specific gravity of about 1.25, and the pH ranges from about 4 to 6.

3. The process of claim 1 wherein, in step (b), the temperature ranges from about 90° to 130° C, and the time ranges from about 10 to 600 minutes.

4. The process of claim 1 wherein the solid-liquid separation of step (d) is carried out by filtration.

5. The process of claim 1 wherein the aqueous solution containing sodium sulphate and sodium bichromate recovered in step (d) is recycled to sodium bichromate processing.

6. The process of claim 1 wherein the aqueous solution of sodim sulfate and sodium bichromate recovered in step (d) is further treated to separate the sodium bichromate therefrom thereby to obtain a substantially pure solution of sodium bichromate.

7. The process of claim 1 wherein the recovered chromium chromate from step (d) is reacted with a mineral acid and then reduced to obtain as a final product a trivalent salt of the mineral acid employed.

8. The process of claim 7 wherein the mineral acid employed is sulfuric acid and the trivalent salt obtained as a final product is chromium sulfate.

9. The process of claim 7 wherein the mineral acid employed as hydrochloric acid and the trivalent salt obtained as a final product is chromium chloride.

* * * * *